UNITED STATES PATENT OFFICE.

MAX NEUMANN, OF WIESBADEN, GERMANY, ASSIGNOR TO GENERAL CHEMICAL COMPANY, OF NEW YORK, N. Y., A CORPORATION OF NEW YORK.

FORMIC ACID.

975,151.  Specification of Letters Patent.  Patented Nov. 8, 1910.

No Drawing.   Application filed June 9, 1910.   Serial No. 566,077.

*To all whom it may concern:*

Be it known that I, MAX NEUMANN, a subject of the Emperor of Germany, and resident of Wiesbaden, Germany, have invented certain new and useful Improvements in the Production of Formic Acid, of which the following is a specification.

This invention relates to the production of formic acid by the decomposition of a formate by means of phosphoric acid. Strong anhydrous formic acid may be obtained by this process as well as weaker or dilute qualities thereof.

This invention is based upon the discovery made by me that, contrary to recorded experience (see, for example, U. S. Patent 857,046 to Francke, p. 1, lines 15 to 19) phosphoric acid can be used for the liberation of formic acid from sodium formate without any substantial loss of formic acid due to decomposition thereof by any of the phosphoric acid used.

In the following I give an example of carrying out this, my invention, and in so doing I wish to be understood as not limiting myself to the exact details therein given since these may be varied without departing from this, my invention. The parts are by weight.

Example: Intimately mix seventy-five (75) parts of dried and very finely powdered sodium formate and one hundred and sixty-four (164) parts of phosphoric acid containing eighty-seven (87) per cent. of absolute phosphoric acid ($H_3PO_4$); during the production of this mixture the temperature of the mass rises and may reach fifty (50) or sixty (60) degrees centigrade; when this temperature diminishes, raise it to a point between seventy (70) and one hundred (100) degrees centigrade by means of an oil bath and maintain it there for a period of from fifteen (15) to thirty (30) minutes; then raise the temperature to a point where distillation begins and gradually increase it until distillation ceases, but do not raise the temperature of the mass above one hundred and forty-five (145) degrees centigrade. The stronger acid comes off first; as the distillation approaches its end, the distillate contains a smaller percentage of formic acid and a larger percentage of water.

The ingredients are mixed without heating, that is to say when they are at work room or normal temperature, so that the temperature during reaction does not rise higher than the degree above indicated. However, the desired result may be obtained even though the ingredients are slightly heated, provided that the mixture does not jointly possess a temperature higher than will, together with the temperature created by the reaction, reach a point at which the formic acid is decomposed. Therefore, when I speak in the claims of mixing the ingredients without the addition of heat, I desire it to be considered as equivalent thereto if I mix them at any degree of temperature which will enable the process to take place without the addition of a diluent and without the decomposition of formic acid. It will probably be found that the temperature of the mixture should not at any time during the reaction be higher than 100° C. under normal conditions if the object of my invention is to be attained. By applying a partial vacuum to the distilling apparatus, a lower temperature may be used and the time required for carrying out the operation is reduced. This use of a partial vacuum has the further advantage that the residue in the distilling vessel may be obtained as a porous mass and conveniently removed from the distilling vessel by treatment with hot water. In this way I have been able to obtain 95.5% of the formic acid contained in the sodium formate used in the distillate and having an average strength of 63.1% of formic acid ($HCO_2H$). By the use of stronger phosphoric acid, for example, such containing ninety-four (94) per cent. of absolute phosphoric acid ($H_3PO_4$) I have been able to obtain 99 per cent. of the formic acid contained in the sodium formate used in the distillate and having an average strength of 70.6% of formic acid ($HCO_2H$). I have also found that the amount of phosphoric acid employed may be reduced considerably so that instead of using one hundred and sixty-four (164) parts of phosphoric acid of eighty-seven (87) per cent. (strength of the above example) I can use as little as one hundred and eight (108) or even ninety-nine (99) parts of a phosphoric acid containing ninety-four (94) per cent. of absolute phosphoric acid ($H_3PO_4$) but in these cases the relative amount of formic acid obtained in the distillate is smaller.

It is not necessary to use pure phosphoric acid to obtain the results above given; crude phosphoric acid contaminated with iron, alumina and like things can be employed without materially affecting the quality or quantity of the formic acid produced, particularly not if care be exercised in producing and maintaining an intimate mixture of the interacting materials. I have also found that dried and finely ground monosodium phosphate or a mixture containing it can be employed in place of phosphoric acid, suitable amounts of said monosodium phosphate being used. In place of sodium formate I may use other formates, such as potassium formate and ammonium formate.

I claim:

1. The process of making formic acid which consists in causing a formate and phosphoric acid to interact at a temperature below that at which the formic acid is decomposed, substantially as and for the purpose described.

2. In the process of making formic acid the step which consists in mixing a formate and phosphoric acid and allowing the same to interact without the addition of heat, substantially as and for the purpose described.

3. In the process of making formic acid the step which consists in mixing a formate and phosphoric acid and allowing the same to interact at a temperature below that at which the formic acid is decomposed, substantially as and for the purpose described.

4. The process of making formic acid which consists in causing a formate and phosphoric acid to interact without the addition of heat until there is no longer any rise in temperature due to the reaction, substantially as and for the purpose described.

5. The process of making formic acid which consists in causing a formate and phosphoric acid to interact without the addition of heat until there is no longer any rise in temperature due to the reaction, and then isolating the formic acid so produced, substantially as and for the purpose described.

6. The process of making formic acid which consists in causing a formate and phosphoric acid to interact without the addition of heat until there is no longer any rise in temperature due to the reaction, and then isolating the formic acid so produced by distillation, substantially as and for the purpose described.

7. The process of making formic acid which consists in causing a formate and phosphoric acid to interact without the addition of heat until there is no longer any rise in temperature due to the reaction and then isolating the formic acid so produced by distillation under diminished pressure, substantially as and for the purpose described.

8. The process of making anhydrous formic acid which consists in causing sodium formate to react with phosphoric acid, of a strength between 92% and 95% of absolute phosphoric acid, $H_3PO_4$, without the addition of heat, substantially as and for the purpose described.

In testimony whereof I have hereunto set my hand in the presence of two subscribing witnesses.

MAX NEUMANN.

Witnesses:
HERMAN PLISCHNE,
MAX DIESCHE.